United States Patent
Boberg et al.

(10) Patent No.: US 11,212,740 B2
(45) Date of Patent: Dec. 28, 2021

(54) WIRELESS ACCESS NETWORK SELECTION

(71) Applicant: Telefonaktiebolaget LM Ericsson (publ), Stockholm (SE)

(72) Inventors: Christer Boberg, Tungelsta (SE); Tomas Hedberg, Nacka (SE); Morgan Lindqvist, Sundbyberg (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 16/638,383

(22) PCT Filed: Aug. 14, 2017

(86) PCT No.: PCT/SE2017/050822
§ 371 (c)(1),
(2) Date: Feb. 11, 2020

(87) PCT Pub. No.: WO2019/035748
PCT Pub. Date: Feb. 21, 2019

(65) Prior Publication Data
US 2020/0367152 A1    Nov. 19, 2020

(51) Int. Cl.
*H04W 48/18* (2009.01)
*H04W 24/10* (2009.01)
(Continued)

(52) U.S. Cl.
CPC ........... *H04W 48/18* (2013.01); *H04W 24/10* (2013.01); *H04W 48/14* (2013.01); *H04W 48/17* (2013.01); *H04W 84/042* (2013.01)

(58) Field of Classification Search
None
See application file for complete search history.

(56) References Cited

U.S. PATENT DOCUMENTS

| 9,888,429 B2 * | 2/2018 | Kim | H04W 48/16 |
| 2012/0196644 A1 * | 8/2012 | Scherzer | H04W 48/18 455/524 |

(Continued)

OTHER PUBLICATIONS

International Search Report and Written Opinion of the International Searching Authority, PCT/SE2017/050822, dated Nov. 27, 2017, 20 pages.

(Continued)

*Primary Examiner* — Hong S Cho
(74) *Attorney, Agent, or Firm* — Sage Patent Group

(57) ABSTRACT

The present disclosure provides a method of enabling wireless access network selection at a multiplicity of wireless client devices. The method comprises: for each of a plurality of wireless access networks, collecting data indicative of at least wireless access technology, geographic coverage and performance; storing said data in a database available to a server; deriving, at the server, a client device network selection policy from the data, the policy defining network measurements to be carried out by a client device and criteria to be used by the client device to select one or more wireless networks; sending the network selection policy to a wireless client device; and applying the network selection policy at the wireless client device to select and attach to one or more given wireless access networks, performing one or more of said network measurements on the given wireless access network(s) and using the results to make a determination to remain attached to the given wireless access network(s) or to select and attach to a further wireless access network or networks.

17 Claims, 3 Drawing Sheets

(51) Int. Cl.
*H04W 48/14* (2009.01)
*H04W 48/00* (2009.01)
*H04W 84/04* (2009.01)

(56) References Cited

U.S. PATENT DOCUMENTS

| | | |
|---|---|---|
| 2014/0092731 A1 | 4/2014 | Gupta |
| 2015/0119101 A1 | 4/2015 | Cui et al. |
| 2015/0215832 A1* | 7/2015 | Fitzpatrick ...... H04W 36/00837 |
| | | 455/426.1 |
| 2016/0309405 A1 | 10/2016 | Gupta |
| 2017/0245316 A1* | 8/2017 | Salkintzis ............. H04W 76/10 |
| 2018/0027466 A1* | 1/2018 | Trott ................. H04W 36/0079 |
| | | 455/437 |

OTHER PUBLICATIONS

3rd Generation Partnership Project; Technical Specification Group Core Network and Terminals; Access Network Discovery and Selection Function (ANDSF) Management Object (MO) (Release 14) 3GPP TS 24.312 V14.1.0 (Jun. 2017) XP051304090, 394 pages.

* cited by examiner

WIRELESS ACCESS NETWORK SELECTION

CROSS REFERENCE TO RELATED APPLICATIONS

This application is a 35 U.S.C. § 371 national stage application of PCT International Application No. PCT/SE2017/050822 filed on Aug. 14, 2017, the disclosure and content of which is incorporated by reference herein in its entirety.

TECHNICAL FIELD

The present invention relates to a method of selecting a wireless access network for a wireless client device and more particularly to such a method that deploys appropriate selection policies into the wireless client device.

BACKGROUND

Mobile or cellular wireless network technologies such as Public Land Mobile Networks (PLMN) have long supported mechanisms to facilitate network and access technology selection by wireless client devices. For example, PLMNs may support manual and/or automatic PLMN selection. In manual PLMN selection, a device or user equipment (UE) initiates a scan and selects a PLMN to attach to from a list of found and displayed PLMNs. In automatic selection, the device or UE attaches to a PLMN based on data stored in the UE's SIM card and stays attached to that PLMN until all contact is lost, whereupon the UE scans all frequencies supported by the UE to identify available PLMNs, and selects the PLMN with the highest priority according to some predefined policy.

The current mechanisms for providing wireless access network connectivity are tightly connected to the traditional ways that telecom network operators have provided services. Typically, operators act over a geographically limited area with competition among other local operators. Each operator has their own separate network with spectrum, radio, core and services.

There is an increasing interest in so-called 'global connectivity' solutions, i.e. network access solutions that are not restricted to specific national PLMNs alone or national PLMNs in collaboration with their selected international roaming partners. Such solutions are of particular relevance to shipping and freight industries, vehicle manufacturers, emerging Internet of Things (IoT) applications, etc., all of which often require a single global communication solution. These global connectivity solutions can, depending on, e.g. commercial agreements, use almost any PLMN or indeed any wireless access network (including WiFi) that offers Internet connectivity.

Whilst providing for much greater flexibility in terms of wireless network attachment, global connectivity solutions will potentially increase the challenges associated with wireless network selection (e.g. roaming) as the number of networks available to client devices can be relatively high and network properties and access technologies may vary greatly. It is unlikely that traditional PLMN-type selection mechanisms will be appropriate particularly as networks may appear and disappear, and change their properties and performance characteristics, relatively frequently.

SUMMARY

In view of the foregoing, an object of the present disclosure is to obviate at least one of the above disadvantages by providing an improved access network selection method.

According to a first aspect of the present invention there is provided a method of enabling wireless access network selection at a multiplicity of wireless client devices. The method comprises: for each of a plurality of wireless access networks, collecting data indicative of at least wireless access technology, geographic coverage and performance; storing said data in a database available to a server; deriving, at the server, a client device network selection policy from the data, the policy defining network measurements to be carried out by a client device and criteria to be used by the client device to select one or more wireless networks. The method further comprises sending the network selection policy to a wireless client device; and applying the network selection policy at the wireless client device to select and attach to one or more given wireless access networks, performing one or more of said network measurements on the given wireless access network(s) and using the results to make a determination to remain attached to the given wireless access network(s) or to select and attach to a further wireless access network or networks.

The method may comprise sending from a wireless client device to said server a request for a client device network selection policy, said steps of deriving and sending being responsive to receipt of the request by the server. Said request may include a current location of the wireless client device, and said step of deriving a client device network selection policy comprising deriving the policy based on that current location. The network measurements may comprise network bitrate and latency.

The client device network selection policy may comprise network conditions and performance thresholds. Said step of using the results to make a determination to remain attached to the given wireless access network(s) or to select and attach to a further wireless access network or networks, may comprise comparing said results against one or more of said network conditions and performance thresholds.

The client device network selection policy may comprise a validity time and validity area defining the time period and geographic area over which the policy is valid.

Said plurality of wireless access networks may comprise a plurality of Public Land Mobile Networks (PLMNs). Said step of collecting data may comprise collecting pricing data for each of said wireless access networks.

Said step of applying the network selection policy at the wireless client device to select and attach to one or more given wireless access networks, or of attaching to a further wireless access network or networks, may result in simultaneous attachment to two or more networks for the purpose of connectivity aggregation.

Said step of deriving may comprise deriving a client device network selection policy comprising a separate policy for each of a plurality of modems available at the wireless client device and said step of applying comprises applying the policies to respective modems, said further steps of performing and using being carried out per modem.

According to a second aspect of the present invention there is provided a wireless client device comprising: one or more modems for attaching to a wireless access networks, the modem using a wireless access technology; a policy receiving unit, configured to receive a client device network selection policy defining network measurements to be carried out by the client device and criteria to be used by the client device to select a wireless access network; and a policy enacting unit configured to apply the network selection policy at the wireless client device to select and attach to a given wireless access network, perform one or more of said network measurements on the given wireless access network, and use the results to make a determination to remain attached to the given wireless access network or to select and attach to a further wireless access network.

The wireless client device may comprise a plurality of said modems, wherein said client device network selection policy comprises a policy for each modem and said policy enacting unit is configured to apply said steps of selection and attachment, performing, and using, on a per modem basis.

According to the present invention there is provided a vehicle comprising the wireless client device of the above second aspect of the present invention.

According to a third aspect of the present invention there is provided a server for enabling wireless access network selection at a multiplicity of wireless client devices, comprising: a database containing, for each of a plurality of wireless access networks, data indicative of at least wireless access technology, geographic coverage and performance; a policy derivation unit, configured to derive a client device network selection policy from the data, the policy defining network measurements to be carried out by a client device and criteria to be used by the client device to select a wireless network; and a policy transmission unit, configured to send the derived policy to one or more client devices.

Said policy derivation unit may be configured to derive a client device network selection policy comprising a policy for each of a plurality of modems of the wireless client device.

DETAILED DESCRIPTION

Figure 1:
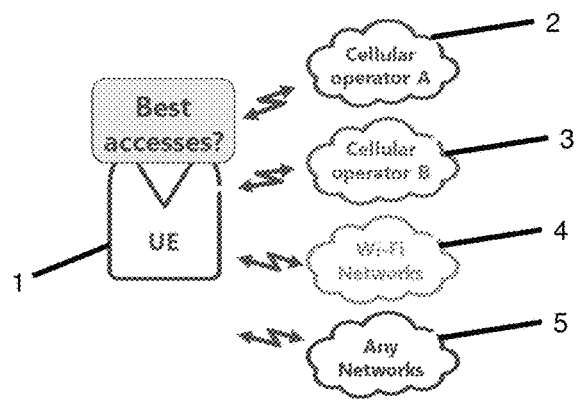
FIG. 1 illustrates schematically different wireless access networks available to a user equipment.

In the context of a global connectivity solution for wireless client devices (referred to hereinafter as "User Equipments" or "UEs"), FIG. 1 illustrates a number of different wireless access networks available to a given UE 1 at a given location. The one or more networks may be operated by different network providers and use different wireless access technologies. For example, the networks may comprise one or more of: GSM, GPRS, EDGE, 3GPP, WCDMA, HSDPA, HSPA+, WiMAX, LTE, LTE-Advanced, Wi-Fi, 5G New Radio (NR), LoRA and satellite network technologies. The signal strength and performance of the networks available to the UE 1 will vary of course with geographical location. As discussed above, the conventional approach to network selection is either a manual selection from a list of available networks or automatic selection based upon statically configured (at the UE) preferences.

Figure 2:
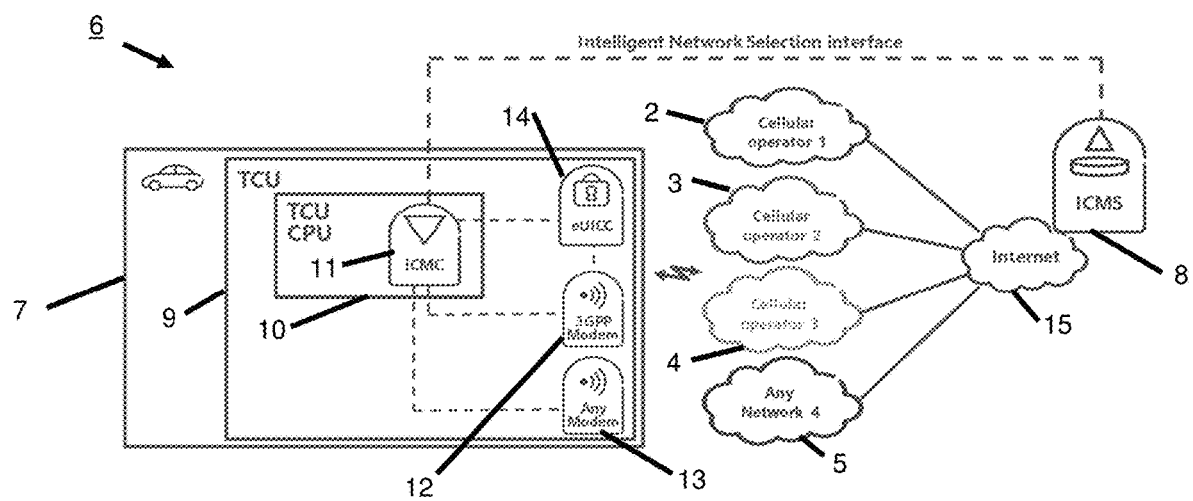
FIG. 2 is a schematic diagram illustrating a network selection system according to a first embodiment of the invention.

FIG. 2 is a schematic diagram illustrating a network selection system 6 according to a first embodiment of the invention, considering the case where the UE is on board a vehicle 7 such as a car. As with the scenario of FIG. 1, four wireless access networks 2, 3, 4, 5 are available to the UE in its "current" location. The vehicle 7 comprises a Telematics Control Unit (TCU) 9 for wireless communication. The TCU 9 comprises a TCU CPU 10 including an Intelligent Connectivity Management Client (ICMC) 11, a 3GPP modem 12, a modem 13 and an eUICC module 14. The modems enable the TCU to connect to one or more of the networks 2-5. The TCU 9 may comprise one or more different types of modem, to allow simultaneous connection to multiple network access technologies. Alternatively, the TCU 9 may comprise multiple modems of the same type, to allow simultaneous connection to multiple network operators using a single network access technology.

A global connectivity solution provider operates an Intelligent Connectivity Management Server (ICMS) 8 accessible via the Internet 15. In practice the ICMS may be, for example, a dedicated server, a server cluster, or a function located with the Cloud. The ICMS 8 operates within the network selection system 6 together with the ICMC 11 of the TCU 9. A primary function of the ICMS 8 is to create wireless access network selection policies that are sent to the TCU 9 and enacted by the ICMC 11. The network selection policies determine which of the networks 2-5 available to the modems 12,13 should be used by the TCU 9 under different circumstances. In the embodiment shown in FIG. 2, the vehicle 7 is within range of three different cellular networks 2, 3, 4, provided by three different cellular operators, and a fourth network 5. The fourth network 5 uses a different network access technology to the cellular networks 2, 3, 4. For example, the fourth network 5 may be a Wi-Fi, LoRA or satellite network. All networks 2-5 provide access to the Internet 15 and therefore to the ICMS 8.

The ICMS 8 has access to network information about the geographical coverage, performance (e.g. bitrate and latency) and access technologies of the different networks 2-5. The ICMS 8 may also have access to network pricing information, and information about operator policy information. This information may comprise both statically configured data, e.g. based on agreements between network operators and the global connectivity service provider, or agreements between the global connectivity service provider and the users of the global connectivity service solution, and dynamically collected data, e.g. collected from networks (and or UEs) in real-time or near real-time. The network information may be stored in a database at the ICMS 8, or one or more remote databases accessible to the ICMS 8. The operator policy information may be specific for example to the vehicle manufacturer that the global connectivity service is provided to, or a fleet manage, company, individual etc that is subscribed to the service. The ICMS 8 may also have access to TCU information provided by the TCU 9, including TCU (vehicle) location, heading and network signal strength and performance measurements performed by the TCU 9. The ICMS 8 may continually update the network information with network signal strength and performance measurements from this and other client devices.

The ICMS 8 generates Intelligent Connectivity Management (ICM) information and provides the generated ICM information to the ICMC 11. The ICM information may be sent to individual TCUs (unicast), a group of TCUs (multicast) or all TCUs controlled by the ICMS (broadcast). The ICM information comprises one or more policy rules that, when enacted, determine which networks 2, 3, 4, 5 the TCU 9 should connect to under different circumstances. The ICM information may optionally include a validity area and validity time, to specify a geographical area and time period for which the policy rules are valid.

Each policy rule comprises thresholds and network selection actions that determine the networks to be selected. A policy rule may optionally comprise conditions related to the thresholds. The conditions may be pre-specified in the ICMC 11, such that only the threshold values for these conditions are sent from the ICMS 8 to the ICMC 11. The policy rule conditions and thresholds use predefined logic. Thresholds relate to local network information that the TCU 9 can measure, for example signal strength/quality, network bitrate, latency, or other data transfer measurements. Measurements may be obtained by sending dummy test data via unused connections or by performing occasional 'test selection' of connections. Measurements may be performed by the modems 12,13 in the TCU 9, or by a separate scanning device in the TCU 9 (not shown in the Figures). One example of a threshold is bitrate and latency per network as measured by the modems 12,13. In this case the policy rule may be defined as "acceptable performance level to select PLMN X".

A network selection action instructs the TCU 9 to perform a specific network task. For example, the network selection action may require the TCU 9 to attach to a network and quantify the performance of the network. The network selection action may instruct the TCU 9 to perform one or more of the following tasks:

"Attach to a network": the network selection action defines that the TCU 9 should attach to a specific network. This may further be divided into "only attach" or "attach and start using the network".

"Select between already attached networks": the network selection action defines that the TCU 9 should select between already attached networks.

"Test attach to a network": the network selection action defines that the TCU 9 should attach to a specific network and perform measurements needed for the evaluation of the policy rules. After this the TCU 9 may detach from the specific network, or continue using it based on the policy rules and performed measurements.

"Test already attached network": the network selection action defines that the ICMC 11 should select one of the already attached networks and perform measurements needed for the evaluation of the policy rules. After this the TCU 9 may for example detach from this network, continue using another attached network, or continue using this network based on the policy rules and performed measurements.

The policy rules may directly instruct the TCU 9 to connect to specific networks, or the policy rules may contain one or more criteria that the TCU 9 can use to select one or more of the available networks 2, 3, 4, 5. Where the TCU 9 comprises multiple modems, different policy rules may be provided for each modem to optimise usage of the modems. For example, if the TCU 9 comprises multiple modems of the same type, the policy rules may require that each modem connects to a different network operator. The policy rules may require that different modems using different networks operate on frequency spectra that are sufficiently spaced apart. The TCU 9 may provide information regarding the modems to the ICMS 8. The ICMS 8 can then provide policy rules optimised for the specific modems in a particular TCU 9, taking into account the performance and characteristics of each modem. If the current location (and heading) of the TCU 9 is known to the ICMS 8, the policy rules may be based on the current location (and heading), in addition to the information accessible by the ICMS 8.

The policy rules may be provided by the ICMS 8 on request by the TCU 9, or at regular intervals or as required by the ICMS 8 provider. Optionally, only one set of policy rules may be sent to the TCU 9. Each policy rule may be of different complexity, depending on whether the TCU 9 is mobile or stationary. Stationary devices have less need for dynamic rules than mobile devices, where conditions can change unexpectedly. If the TCU 9 is mobile, the policy rules may cover both the current geographic area of the TCU 9 and surrounding geographic areas.

The logic defined in the policy rules may require new functionality between the ICMC 11 and the modems 12,13, for example new APIs. Current APIs only allow some limited measurements after attaching to a network (and then only measurements of the current serving cell). This can be circumvented by extension of existing APIs or by adding a separate network scanner (not shown in the Figures) that is able to perform measurements on, e.g. different "cells" or access points without actively connecting to the network. A separate 3GPP scanner may be implemented by measuring energy levels per different entity of the network (e.g. EARFCN in LTE/E-UTRAN networks) without attaching to the network.

The policy rules provide increased flexibility in network utilisation that can benefit both clients and network providers, through optimisation of different network and client configurations. For example, the policy rules may enable the TCU 9 to connect to the most appropriate network for accessing a particular service, e.g. OTT content, depending on the service requirements. The policy rules may also be formulated such that overall network performance is optimised. For example, if the information accessed by the ICMS 8 shows that certain networks are congested, the policy rules can prioritise uncongested networks to reduce the strain on congested networks. The policy rules thus provide an effective and real-time way of optimising network usage.

Figure 3:
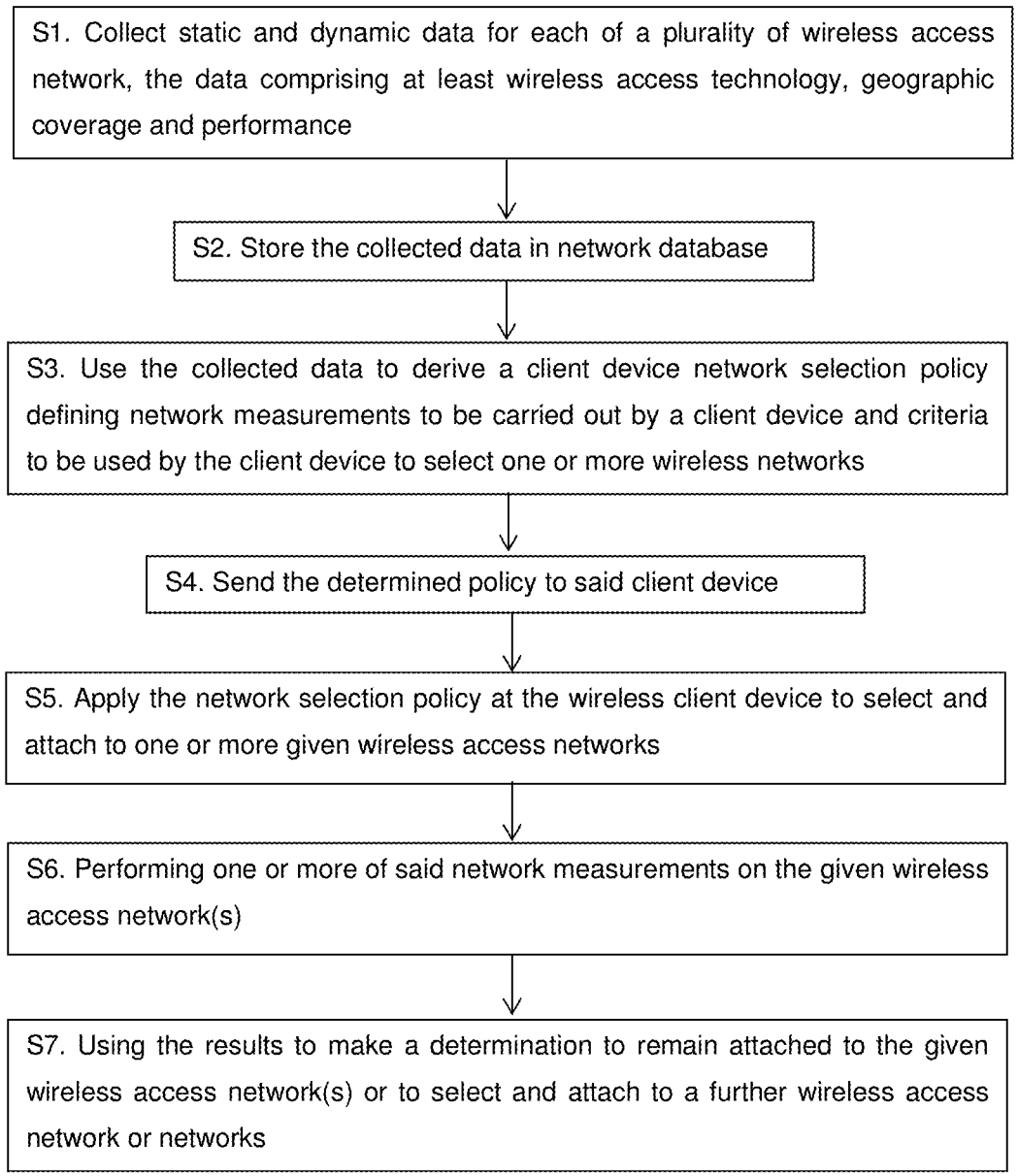
FIG. 3 is a flow diagram illustrating further the embodiment of FIG. 2.

FIG. 3 is a flow chart illustrating at a high level the method described above. The method performs the following steps:

S1. Collect static and dynamic data for each of a plurality of wireless access network, the data comprising at least wireless access technology, geographic coverage and performance.

S2. Store the collected data in network database.

S3. Use the collected data to derive a client device network selection policy defining network measurements to be carried out by a client device and criteria to be used by the client device to select one or more wireless networks.

S4. Send the determined policy to said client device.

S5. Apply the network selection policy at the wireless client device to select and attach to one or more given wireless access networks.

S6. Performing one or more of said network measurements on the given wireless access network(s).

S7. Using the results to make a determination to remain attached to the given wireless access network(s) or to select and attach to a further wireless access network or networks.

Figure 4:
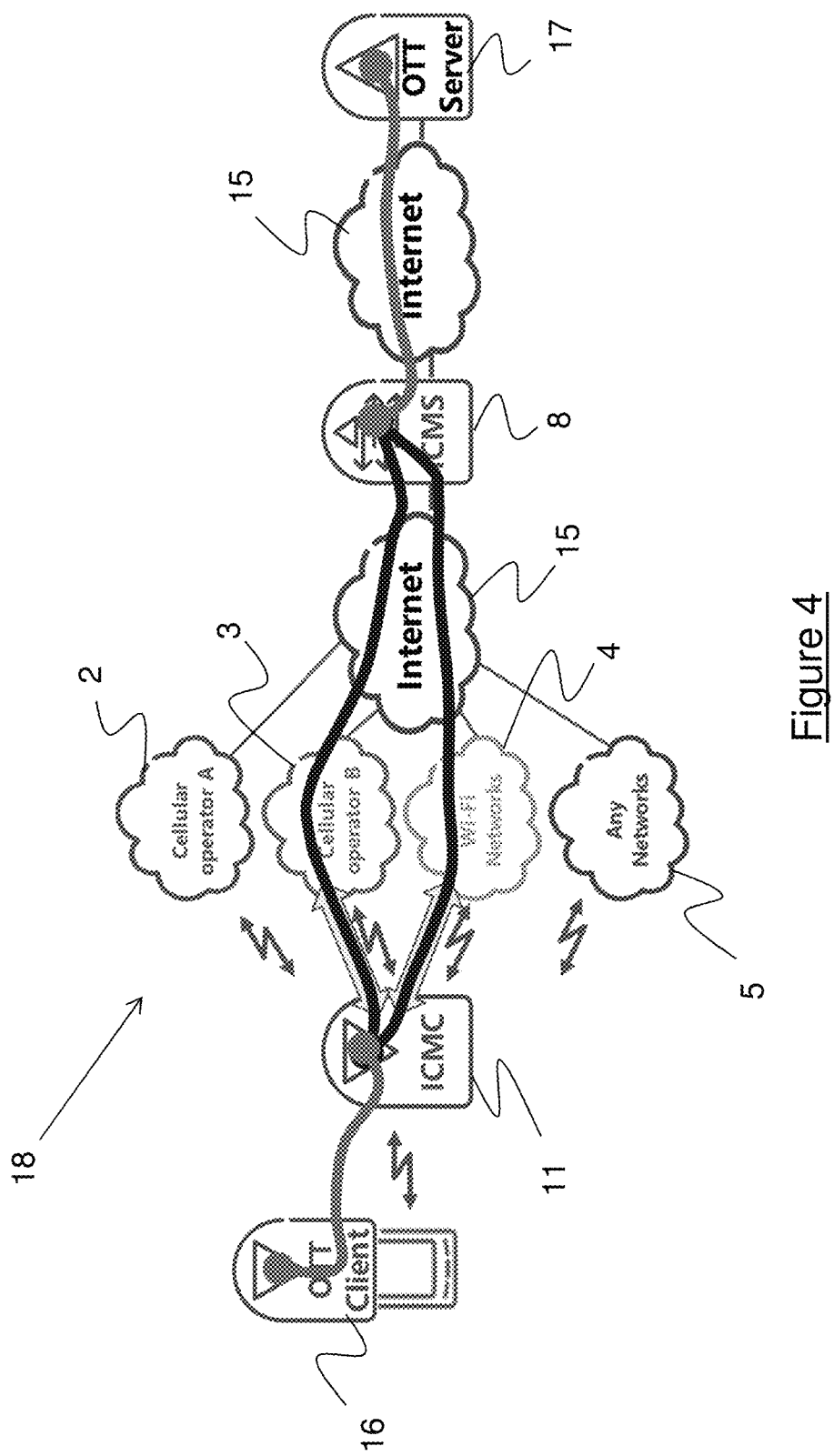
FIG. 4 is a schematic diagram illustrating a network selection system according to a second embodiment of the invention.

FIG. 4 is a schematic diagram illustrating a network selection system according to a second embodiment of the invention. The second embodiment relates to connectivity aggregation, in which multiple networks are used simultaneously. In the embodiment illustrated in FIG. 3, a connectivity aggregation system 18 is used to provide a connection between an OTT client 16 and OTT server 17. The OTT server 17 sends over the top (OTT) content to the OTT client 16. The OTT client 16 may be, for example, a mobile device. Connectivity aggregation is provided by the ICMC 11 in the TCU 9 connecting to the ICMS 8 through multiple access networks 2-5 simultaneously. As in the first embodiment, all of the access networks 2-5 provide access to the internet 15.

In the embodiment shown in FIG. 3, the ICMS 8 is connected to the OTT server 17 via the internet.

In addition to performing connectivity aggregation between the ICMC 11 and ICMS 8, connectivity aggregation may also be performed between the ICMC 11 and another function on network side (i.e. as OTT for the currently selected access networks). Since connectivity aggregation is performed between the ICMC 11 and the ICMS 8 or other network side function, connectivity aggregation is invisible to the OTT client 16 and OTT server 17. Connectivity aggregation thus allows for uninterrupted OTT access. In the embodiment shown in FIG. 3, connectivity aggregation is performed between the ICMC 11 in the TCU 9 and ICMS 8. However connectivity aggregation may be provided between clients in the TCU 9 besides the ICMC 11, and network side functions besides the ICMS 8.

As in the first embodiment, the ICMS 8 provides Intelligent Connectivity Management (ICM) information to the ICMC 11. The ICM information of the second embodiment includes extended information over the ICM information of the first embodiment, to provide information for connectivity aggregation between the different networks selected based on ICM information.

Connectivity aggregation allows for fast switching between attached access networks and user plane aggregation between access networks. Connectivity aggregation enables the possibility of advanced traffic steering logic from the ICMS 8 to the ICMC 11 as part of the ICM information. For example, service-based selection of a specific network or service-agnostic aggregation of all traffic between two or more networks may be provided.

In service-based selection of a specific network, a single network is attached at any time for a specific service. Multiple services may require that multiple networks are used. One difficulty in implementing this type of functionality lies in implementing a mechanism that allows the ICMC 11 and ICMS 8 to identify different services. For example, if traffic is encrypted the only available information is at the "5-tuple" level, e.g. only information included in the IP and TCP/UDP headers may be available. Additionally, multiple service flows may be aggregated on a single encrypted connection (and still using the same "5-tuple").

In service-agnostic aggregation of all traffic between two or more attached networks, the different attached networks can be used to provide any service. This is useful, for example, in the case where the total amount of traffic between the ICMC 11 and ICMS 8 exceeds some maximum throughput in a single network. If redundancy is needed, one or more networks may be available in case the primary network connection is lost, instead of sending traffic over multiple simultaneous networks.

It will be appreciated by the person of skill in the art that various modifications may be made to the above described embodiments without departing from the scope of the present invention.

The invention claimed is:

1. A method of enabling wireless access network selection at a multiplicity of wireless client devices, the method comprising:
   for each of a plurality of wireless access networks, collecting data indicative of at least wireless access technology, geographic coverage and performance;
   storing said data in a database available to a server;
   deriving, at the server, a client device network selection policy from the data, the policy defining network measurements to be carried out by a client device and criteria to be used by the client device to select one or more wireless networks;
   sending the network selection policy to a wireless client device; and
   applying the network selection policy at the wireless client device to select and attach to one or more given wireless access networks, performing one or more of said network measurements defined by the policy on the given wireless access network(s) and using the results to make a determination to remain attached to the given wireless access network(s) or to select and attach to a further wireless access network or networks.

2. The method according to claim 1 further comprising sending from a wireless client device to said server a request for a client device network selection policy, said steps of deriving and sending being responsive to receipt of the request by the server.

3. The method according to claim 2, wherein said request includes a current location of the wireless client device, and said step of deriving a client device network selection policy comprising deriving the policy based on that current location.

4. The method according to claim 1, wherein the network measurements comprise network bitrate and latency.

5. The method according to claim 1, wherein the client device network selection policy comprises network conditions and performance thresholds.

6. The method according to claim 5, wherein said step of using the results to make a determination to remain attached to the given wireless access network(s) or to select and attach to a further wireless access network or networks, comprises comparing said results against one or more of said network conditions and performance thresholds.

7. The method according to-claim 1, wherein the client device network selection policy comprises a validity time and validity area defining the time period and geographic area over which the policy is valid.

8. The method according to claim 1, wherein said plurality of wireless access networks comprise a plurality of Public Land Mobile Networks (PLMNs).

9. The method according to claim 1, wherein said step of collecting data comprises collecting pricing data for each of said wireless access networks.

10. The method according to claim 1, wherein said step of applying the network selection policy at the wireless client device to select and attach to one or more given wireless access networks, or of attaching to a further wireless access network or networks, results in simultaneous attachment to two or more networks for the purpose of connectivity aggregation.

11. The method according to claim 1, wherein said step of deriving comprises deriving a client device network selection policy comprising a separate policy for each of a plurality of modems available at the wireless client device and said step of applying comprises applying the policies to respective modems, said further steps of performing and using being carried out per modem.

12. The method according to claim 1, wherein said multiplicity of wireless client devices each comprises a plurality of modems for allowing simultaneous connection to multiple network access technologies.

13. A wireless client device, comprising:
   one or more modems for attaching to a wireless access networks, the modem using a wireless access technology, wherein the client device is configured to:

receive a client device network selection policy defining network measurements to be carried out by the client device and criteria to be used by the client device to select a wireless access network, and apply the network selection policy at the wireless client device to select and attach to a given wireless access network, perform one or more of said network measurements defined by the policy on the given wireless access network, and use the results to make a determination to remain attached to the given wireless access network or to select and attach to a further wireless access network.

14. The wireless client device according to claim 13 further comprising a plurality of said modems, wherein said client device network selection policy comprises a policy for each modem and the client device is further configured to apply said steps of selection and attachment, performing, and using, on a per modem basis.

15. A vehicle comprising the wireless client device of claim 13.

16. A server for enabling wireless access network selection at a multiplicity of wireless client devices, comprising:

a database containing, for each of a plurality of wireless access networks, data indicative of at least wireless access technology, geographic coverage and performance, wherein the server is configured to:

derive a client device network selection policy from the data, the policy defining network measurements to be carried out by a client device and criteria to be used by the client device to select a wireless network, and to send the derived policy to one or more client devices.

17. The server according to claim 16, wherein the server is further configured to derive a client device network selection policy comprising a policy for each of a plurality of modems of the wireless client device.

* * * * *